United States Patent [19]

Carter

[11] 4,268,125
[45] May 19, 1981

[54] METHODS OF FORMING AND METHODS OF CONTROLLING A PIVOTAL MIRROR ASSEMBLY

[76] Inventor: Walter L. Carter, 21429 84th West, Edmonds, Wash. 98020

[21] Appl. No.: 8,596

[22] Filed: Feb. 1, 1979

[51] Int. Cl.³ .............................................. G02B 7/18
[52] U.S. Cl. .................................. 350/320; 350/307; 74/501 M
[58] Field of Search ............... 350/307, 304, 303, 289, 350/320; 74/501 M; 248/476, 479

[56] References Cited

U.S. PATENT DOCUMENTS

| | | | |
|---|---|---|---|
| 2,330,444 | 9/1943 | Park | 350/307 |
| 3,245,283 | 4/1966 | Van Noord | 74/501 M |
| 3,545,290 | 12/1970 | McCord et al. | 74/501 M |

FOREIGN PATENT DOCUMENTS 1505350 10/1969 Fed. Rep. of Germany ...... 350/289

*Primary Examiner*—Jon W. Henry
*Attorney, Agent, or Firm*—Theron H. Nichols

[57] ABSTRACT

A method for viewing by the driver of the blind area on a vehicle side opposite the driver comprises (1) viewing through a pivotally mounted mirror focused on a first line extending outwardly from the vehicle side opposite the driver normal to the vehicle longitudinal axis, and (2) viewing through the mirror as it is pivoted rearwardly through at least 35° for covering the blind area prior to making the turn in the direction of the vehicle opposite side. A few external remote control mirrors and a method for forming a mirror assembly for the side of a vehicle opposite to the driver's side for viewing by the driver of the total blind area on that side are disclosed.

8 Claims, 11 Drawing Figures

U.S. Patent  May 19, 1981  Sheet 1 of 4  4,268,125
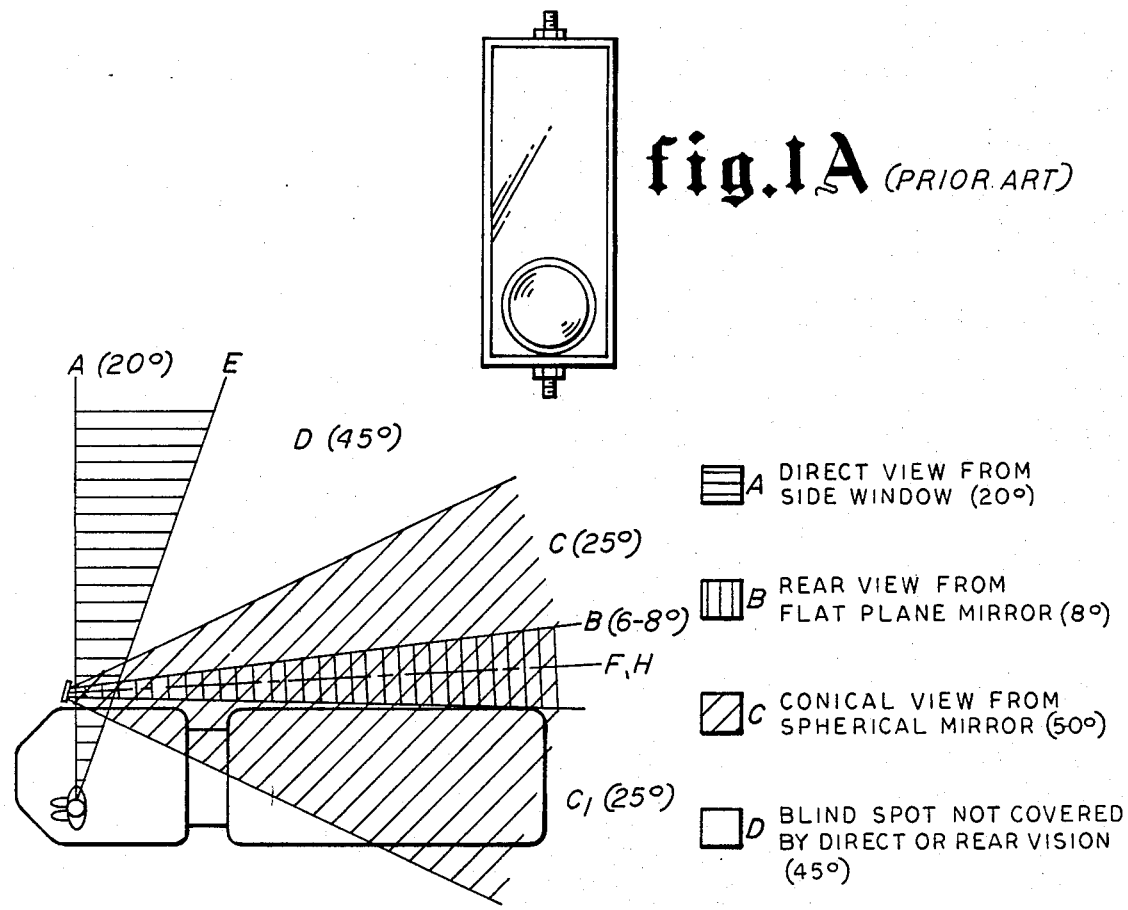
fig.1A (PRIOR ART)
A  DIRECT VIEW FROM SIDE WINDOW (20°)
B  REAR VIEW FROM FLAT PLANE MIRROR (8°)
C  CONICAL VIEW FROM SPHERICAL MIRROR (50°)
D  BLIND SPOT NOT COVERED BY DIRECT OR REAR VISION (45°)
fig.1B (PRIOR ART)
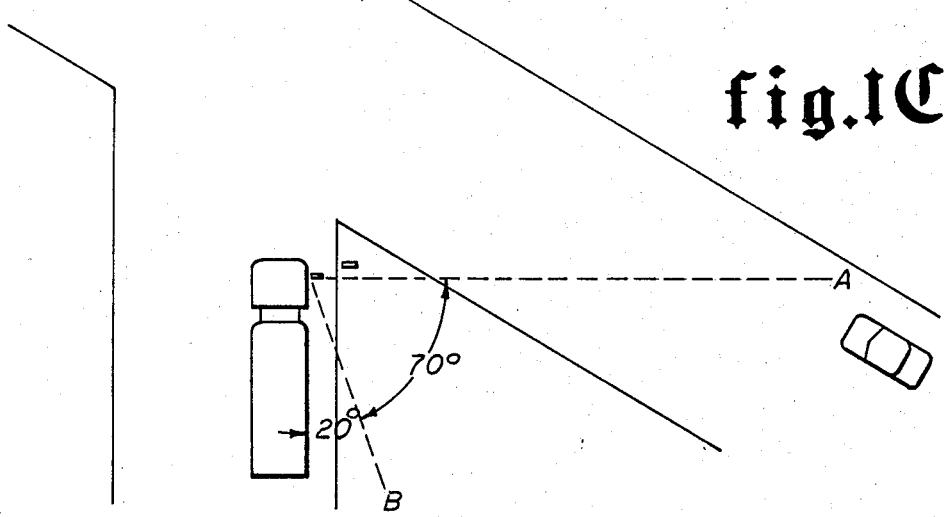
fig.1C

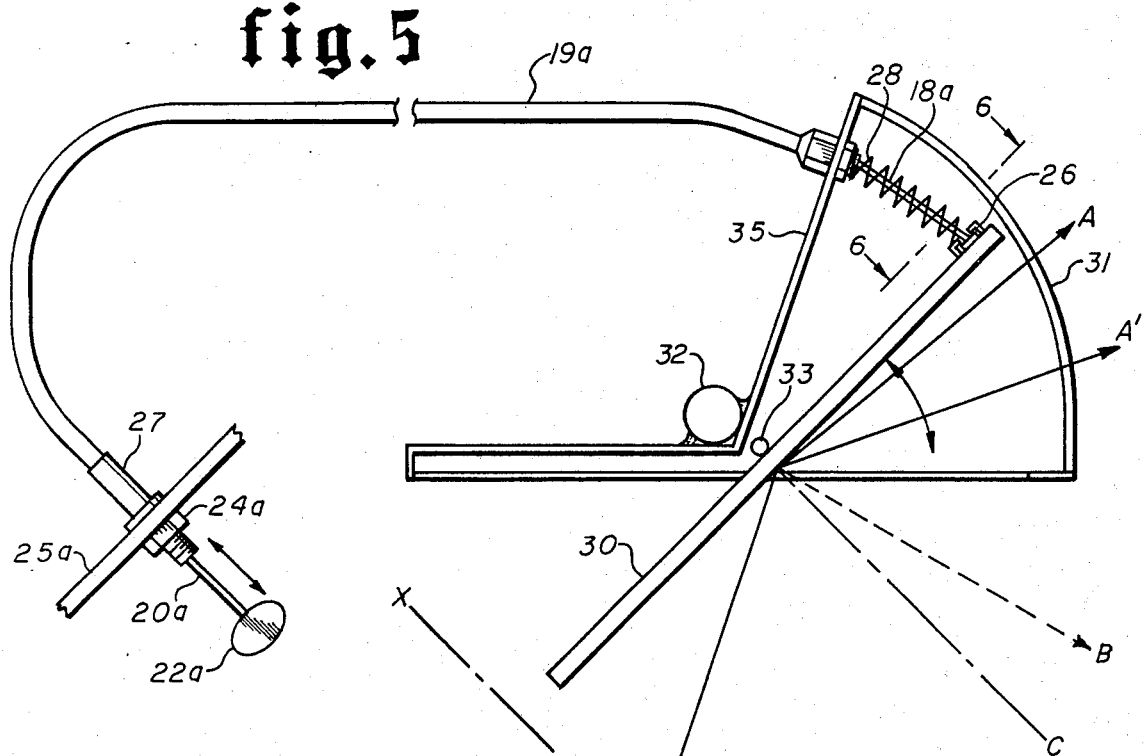
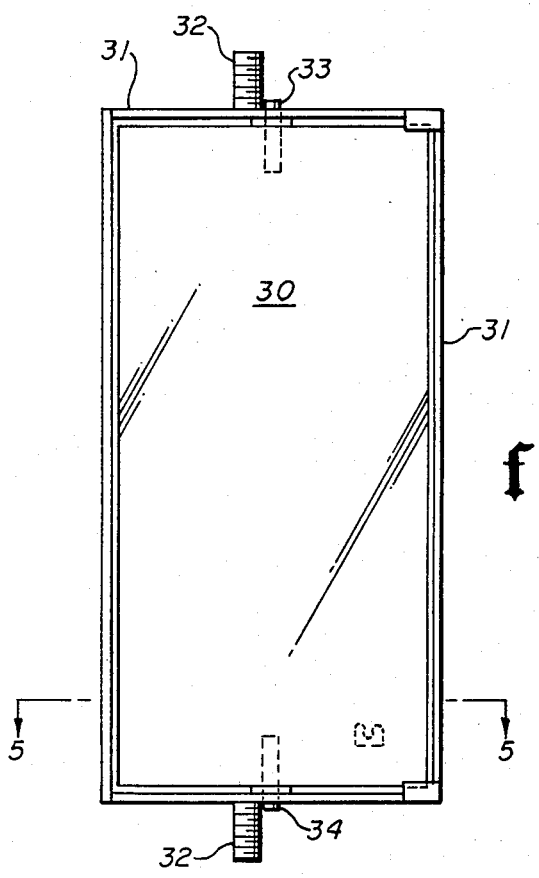
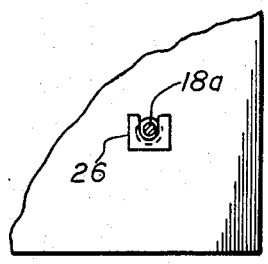

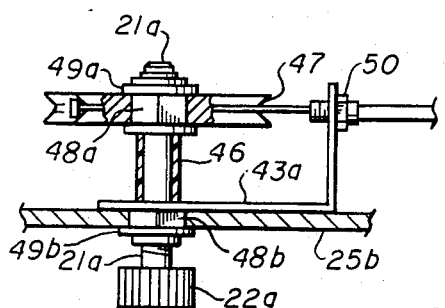
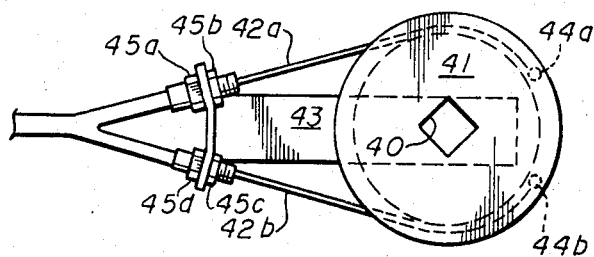
fig. 8
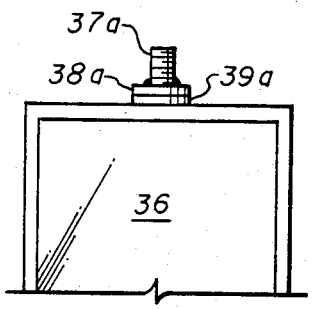
fig. 7
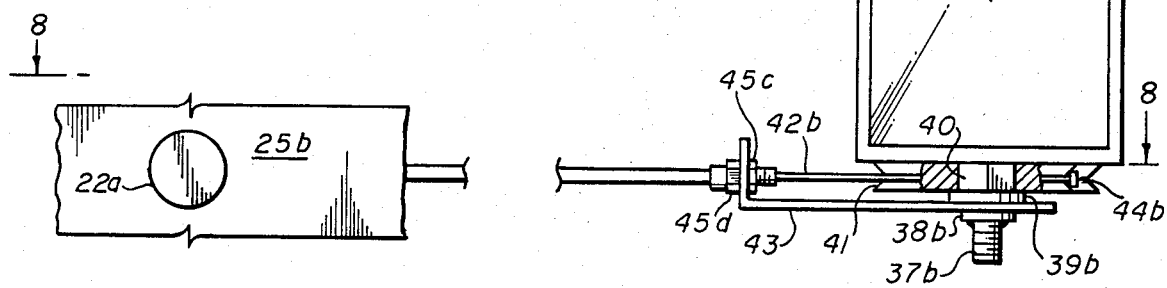
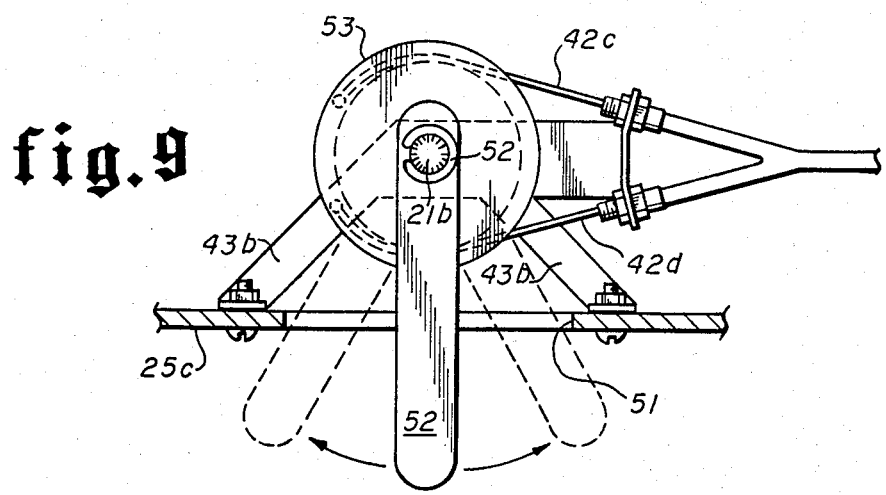
fig. 9

METHODS OF FORMING AND METHODS OF CONTROLLING A PIVOTAL MIRROR ASSEMBLY

BACKGROUND

Drivers of various vehecles and expecially long trucks have a long standing problem of eliminating the blind area to the driver on the side of the vehicle, as an automobile or truck opposite to the driver and behind his view straight out the window of the cab on the vehicle opposite side. Many different mirrors have been assembled but none are entirely successful in providing an efficient, inexpensive, simple mirror combination that covers the entire blind area on the opposite side of a vehicle.

Known prior art includes a pivotal mirror geared to a steering shaft for being maintained on a fixed point when turning, but fails to provide continuous coverage of the entire area with one glance. Likewise, road scum and ice can freeze the gears in this pivotal geared mirror, thus making it inoperable.

Another prior art combination comprises a convex mirror with its flat rear surface adhesively attached to the bottom surface of a flat mirror. A critical part of the blind area not covered is illustrated in FIG. 1B which is very critical to a truck driver stopped on the side road angled to an arterial highway coming in from the opposite side and in the blind area therein as illustrated in FIG. 1C.

OBJECTS OF THE INVENTION

Accordingly, a principal object of this invention is to provide a moveable mirror for viewing the blind area on the side of a vehicle opposite to the driver.

Another principal object of this invention is to provide a method for viewing by a driver of the blind area on the side of his vehicle opposite to the driver.

A further principal object of this invention is to provide a new pivotal mirror assembly including a planar mirror pivotal from square abeam the vehicle to rearwardly of at least 35° for viewing the blind area on the side of a vehicle opposite to the driver.

A still further object of this invention is to provide a method for forming or assembling a mirror assembly for viewing the blind area on the side of a vehicle opposite to the driver.

A further object of this invention is to provide a few new pivotal mirror assemblies that are easy to install and operate, are of simple configuration, are economical to build and assemble, and are of greater efficiency for the viewing of the blind area on the side of a vehicle opposite to the driver.

Other objects and various advantages of the disclosed mirror assemblies, methods of viewing the opposite side of a vehicle, and methods for assembling a mirror combination will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, a few forms of the invention wherein like reference numerals designate corresponding parts in the several views in which:

FIG. 1A is an elevation of a typical conventional mirror of the prior art;

FIG. 1B is a schematic diagrammatic top view of a truck with the conventional mirror of the prior art of FIG. 1A;

FIG. 1C is a schematic top view of a typical highway intersection having a typical spot for a vehicle coming on to a highway from the left side thereof wherein the traffic on the highway coming up from the rear is in the vehicle's blind spot or area;

FIG. 4 is a schematic front view of a modification of the pivotal mirror of FIG. 3;

FIG. 5 is a sectional view at 5—5 on FIG. 4, showing a second modified mirror remote control mechanism;

FIG. 6 is a schematic portion of a front view of another modification of FIG. 5;

FIG. 7 is a schematic front view of a third modified mirror remote control mechanism;

FIG. 8 is a sectional view at 8—8 on FIG. 7; and

FIG. 9 is a schematic top view of a fourth modified mirror remote control mechanism.

Figure 2:
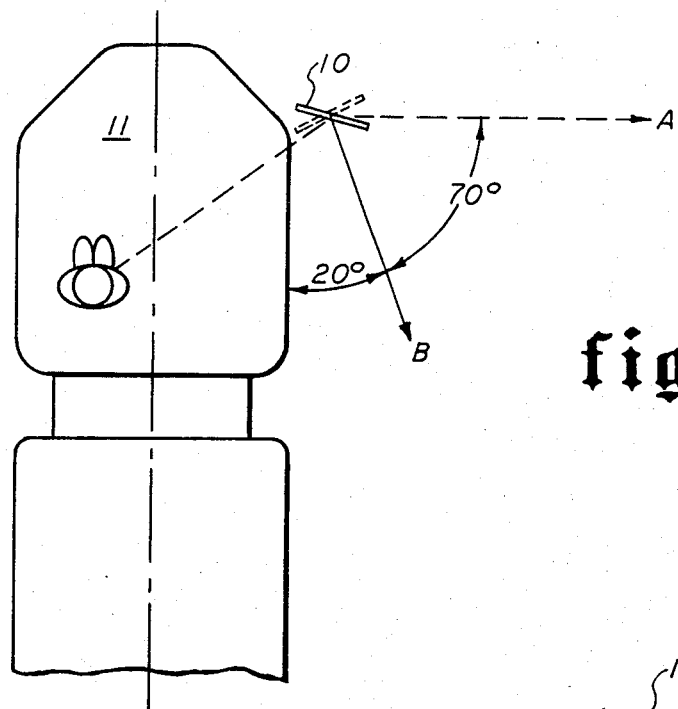
FIG. 2 is a schematic plan view of the new pivotal mirror mounted on the truck of FIG. 1C.

The invention disclosed herein, the scope of which being defined in the appended claims is not limited in its application to the details of construction and arrangement of parts shown and described, since the invention is capable of other embodiments and of being practiced or carried out in various other ways. Also, it is to be understood that the phraseology or terminology employed here is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

DESCRIPTION OF THE INVENTIONS

This patent includes three inventions, a method for viewing by the driver of the blind area on the vehicle side opposite to the driver; several modifications of a mechanism for practicing the above method comprising a remotely operated vehicle mirror for viewing by the driver of the total blind area; and a method for assembling or forming several modifications of a mirror assembly for the side of a vehicle opposite to the driver's side for viewing by the driver of the blind area.

METHOD FOR VIEWING THE BLIND AREA ON THE SIDE OF A VEHICLE OPPOSITE THE DRIVER

FIG. 1B shows one conventional method of attempting to view at least a portion of the blind area to the driver of the area on the opposite side of the vehicle from the driver. This occurs for any vehicle, particularly as a long truck shown in FIG. 1C stopped on the side road illustrated and starting up to drive up on the arterial highway.

The new mirror is only for covering the blind area on the side opposite the driver, which would be to the right side of the vehicle in the United States of America and other countries or locations where the driver is positioned on the left side. However, for those vehicles driven from the right side, this covers the blind area on the left side of the vehicle, i.e., the side opposite the driver is the important feature.

As is well known, there are many rear view mirrors to help the driver where he most needs the view, and that is to the rear on his side, i.e. the driver's side. But few mirrors are designed to solve the problem of covering the other side of the vehicle. Because there is slightly less use and requirement for viewing on the side opposite the driver, the problem of covering this blind spot has had less attention and people tend to ignor it, even though it is a very important problem at times. When people do get serious at solving this problem, it is finally and usually assumed that merely a vehicle right side mirror of the enantiomorphic projection of the left mirror is adequate. However, as shown by the prior attempts to cover the blind area on the right side, a mere allochiral projection of the left mirror is insufficient. Accordingly, the disclosed new mirrors are shown to provide the answers to the above objects of the invention.

The mirror must be rotated only ½ the radial distance or angle for the angle of viewing or visual range produced thereby, the well known law of optics.

The angle rearwardly which a driver, sitting in the left hand side of his cab, for example, sees or views out of his right hand window may vary from 0° to 25°, depending on the particular vehicle and number of people in the seat sitting beside the driver. His right side area D, FIG. 1B, behind the visible area A illustrated is thus usually blind. A typical prior art mirror combination illustrated in FIG. 1A or a convex mirror glued to the bottom of and being coplanar with a planar mirror enables the driver to view by the conventional method of viewing out down the right side of his vehicle in the area $C_1$ (about 25°) through his convex mirror to locate himself, then shifting to the planar mirror for a clear undistorted view of the area B (6°-8°) outward from his truck, and then shifting his view back to the convex mirror again to area $C_2$ (about 25°) for viewing as much of the blind area that is available to be seen between planar area B and the visible area A (about 20°). The center lines or lines of focus of both mirrors of FIG. 1A are substantially congruent as illustrated by lines of focus F, H on FIG. 1B. For the conventional mirror combination of FIG. 1A, this only gives the driver the view of area $C_2$, leaving the rest of blind area D of typically about 45° of blind area beyond the conventional spherical mirror co-planar with the planar mirror of FIG. 1A, as when entering the arterial highway of FIG. 1C from a side road, for example. This provides a hazardous entry upon the arterial highway from a side road.

In FIG. 1C, while the whole right rearward quadrant behind line A substantially defines the blind area, the area swept by a mirror movable from line A to line B is a sufficient area to cover for safety, line B being about 8°-25° out from the right side of the vehicle, 20° being average.

The driver can see out his right window from approximately line A, a line perpendicular or normal to the vehicle longitudinal axis adjacent the driver and the side mirror, in the average long vehicle. The first invention disclosed herein comprises a method for viewing the blind area from the right window view to the right side of the vehicle as prior to making a turn in the direction of the vehicle opposite side which comprises the steps of, (1) viewing through a vehicle (11, FIG. 2) pivotally mounted mirror (10) focused on a first line (A) extending outwardly from the vehicle side opposite the driver normal to the vehicle longitudinal axis (35), (2) pivoting the mirror through at least 35° rearwardly, and (3) viewing through the pivoted mirror focused on a second line (B) extending at an angle of 70° rearwardly from the first line to cover the extremities of the blind area prior to making a turn in the direction of the vehicle opposite side.

Another method for viewing by the driver of the blind area on the vehicle side opposite to the driver, as prior to making a turn in the direction of the vehicle opposite side, comprising the steps of, (a) focusing a vehicle pivotally mounted mirror on a first line extending outwardly from the vehicle side opposite the driver normal to the vehicle longitudinal axis for viewing thereof by the driver along the first line, and (b) pivoting the mirror through at least a visual range of 70° rearwardly for focusing on a second line extending at an angle of 70° rearwardly from the first line for viewing therein by the driver along the second line to cover the extremities of the blind area prior to making a turn in the direction of the vehicle opposite side.

Another method for viewing by the driver of the blind area on the vehicle side opposite to the driver, as prior to making a turn in the direction of the vehicle opposite side, comprises the following steps:

(1) focusing a vehicle pivotally mounted mirror on a first line extending outwardly from the vehicle side opposite the driver and approximately 20° back of the normal to the vehicle longitudinal axis at the point of the mirror mounting for viewing thereof by the driver along the first line, and (2) pivoting the mirror rearwardly through at least a visual range of 50° to a second line for viewing by the driver as the mirror is pivoted for covering the total blind area from the first line to the second line defining the limits of the blind area prior to making a turn in the direction of the vehicle opposite side.

DESCRIPTION OF AN APPARATUS

While various devices may be utilized for carrying out or practicing the inventive methods, or of being assembled by the above methods, FIGS. 1-9 illustrate a few inventive apparatuses for practicing the methods described above or for being assembled by the above methods.

This invention comprises a remote control pivotal mirror 10, FIG. 2, pivotally mounted on a land vehicle 11 such as but not limited to, a truck. It is mounted on the side opposite to the driver for covering that area blind to the driver. While that blind area is on the right side of the vehicle on most land vehicles in the United States of America, Canada, and Mexico, it is on the left side of the land vehicle in a great number of foreign countries having right hand drive or steering wheel on the vehicle right side.

FIGS. 1A and 1B illustrate the prior art as described above, while FIG. 1C illustrates a vehicle with the new mirror thereon.

FIG. 2 illustrates schematically the angles of focus obtained by the mirror 10 mechanisms of FIGS. 3-9. Line A, FIGS. 1C and 2 represents generally the rearward limit line of view of the conventional truck 11 or van driver and line B represents generally the outward limit line of view from the usual or conventional mirror used. This, the area swept clockwise from line A to line B is the usual blind area on the vehicle side opposite the driver. The disclosed mirror 10 provides complete visual coverage of at least this swept area from line A to line B, FIG. 2, if not a little beyond at both ends if so desired, particularly back to the right side of the truck to eliminate the requirement for a second small fixed mirror.

Figure 3:
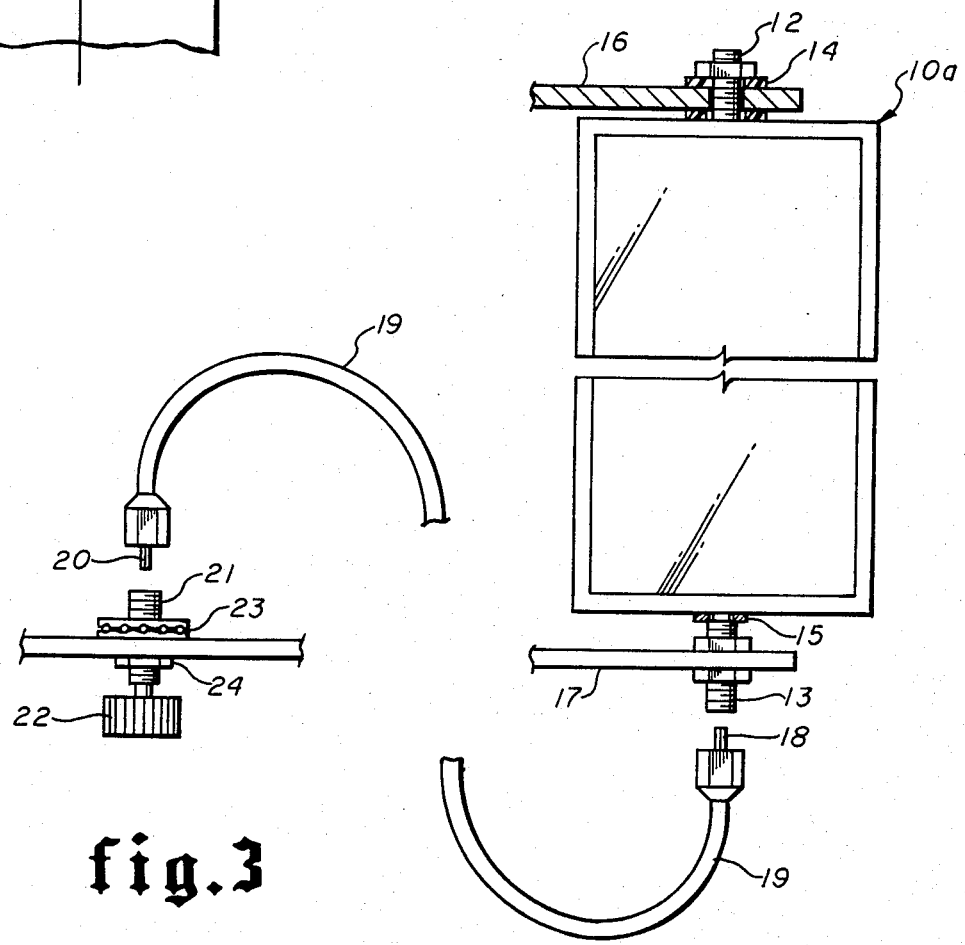
FIG. 3 is a schematic, front view of one modification of the mirror of FIG. 2 showing one mirror remote control mechanism.

FIG. 3 illustrates schematically one embodiment of the new mirror mechanism 10a for obtaining the wide view of FIG. 2. Planar mirror 10a, FIG. 3, having studs 12, 13, is mounted in Nylon swivel connections 14, 15, on braces 16, 17, respectively, extending from the right side of the truck 11, FIG. 2. A square keyed or stud end 18 is formed on one end of coaxial cable 19 for fixedly connecting to the mirror lower stud 13 and a similar square end 20 is formed on the other end of coaxial cable 19 for connecting to stud 21 rotatable by finger control knob 22. On opposite sides of an instrument panel 25 are ball bearings 23 and Hexnut 24 for providing a small but precise adjustment in length of the inner flexible cable having the two fixed square ends 18 and 21.

FIG. 4 and FIG. 5, a section at 5—5 on FIG. 4, disclose a modified mirror 30 mounted in a mirror housing 31, FIG. 5, welded to a centerpost 32 which in turn is fixedly secured to suitable supports not shown similar to 16 and 17 of FIG. 3 extending from the truck opposite side including a second modified mirror remote control mechanism. Mirror 30, FIG. 4, is pivotally mounted on upper and lower studs 33 and 34 in the housing frame 31 for pivotal movement between a first extreme position illustrated in broken lines for projecting a line of focus A, FIG. 5, normal to the vehicle longitudinal axis 35a and adjacent the side mirror, and a second extreme position illustrated in solid lines for projecting a line of focus B for providing at least 70° of sweep, if not a full 90° of sweep if so necessitated, of the blind area on the opposite side of the truck from the driver.

FIGS. 5 and 6 illustrate the mirror actuating system of the second modified mirror remote control mechanism. Cable 19a, FIG. 5, with its outer end 18a, FIGS. 5 and 6, is fitted into and latched to mirror connecting slot 26 on the back of the mirror. The cable inner end 20a extends through a conventional frictional grip device 27 on instrument panel 25a to connect to push-pull hand control knob 22a. Compression spring 28 maintains coaxial cable 19a tight and prevents rattling when the mirror is in any position desired when the mirror is sweeping the blind area with the hand control knob or is stopped for further observation at the desired position.

Thus when viewing from the vehicle's driver's location I, FIG. 5, the mirror 30 may be adjusted with hand knob 22a to sweep for viewing out center line of focus A normal to the vehicle on the side opposite the driver rearwardly to center line of focus A′ where rearwardly thereof visibility of the driver ceases. The mirror may then continue to be rotated to sweep the normally blind area from at least line A′ to line B or at least back to a line C, parallel to the vehicle longitudinal axis X–Y.

FIG. 7 and FIG. 8, a sectional view at 8—8 on FIG. 7, both disclose a third modified remote control pivotal mirror assembly for viewing by the driver of the blind area on a vehicle side opposite the driver.

The modified planar mirror 36, FIG. 7, has an upper spindle 37a and a lower spindle 37b for mounting on mirror braces like 16 and 17, FIG. 3. At the top, a metal washer 38a is spot welded to upper spindle or stud 37a and a Nylon washer 39a, or the like is mounted between washer 38a and the top of mirror 36 for free oscillatory movement of the mirror about its stud 37a. A square nut 40, FIG. 7 is welded to the mirror bottom for being positioned in a square hole centered in a pulley 41 for transmission of torque from two control cables 42a and 42b, FIG. 8, to the mirror by an exact amount of an arc or angle of rotation in a range of over 90°. Between a cable support bracket 43 fastened to the side of the vehicle opposite the driver and 38b is spot welded to the lower stud 37b firmly against the lower surface of the support bracket 43. Two suitable locking tabs 44a and 44b fixedly attach the ends of the control cables 42a and 42b, respectively, to the pulley. Locking pairs of nuts 45a, 45b and 45c, 45d, FIG. 8, position the cable housing relative to the support bracket 43 to either tighten or loosen the control cables 42a and 42b.

On the left side of FIG. 8 is the dash board or instrument panel 25b, FIGS. 7 and 8, with the knob shaft or stud 21a, FIG. 8, protruding through the instrument panel, through the vehicle mounted support bracket 43a, through a sleeve 46, and through a second vehicle mounted pulley wheel 47. Nuts 48a and 48b with their respective washers 49a, 49b mount the second pulley wheel 47 on the knob stud 21a for rotating the first pulley wheel 41. A circular clip may be substituted for the nut 48a, FIG. 8, if so desired. Locking nut 50 positions the threaded portion of the cable housing relative to support bracket 43a for tightening or loosening the control cables 42a and 42b on pulley wheel 47. Locking tabs 44c, FIG. 8, and 44d (not shown) fixedly attach the inner ends of the control cables 42a and 42b to the pulley wheel 47.

Thus in FIGS. 7 and 8, rotation of control knob 22a, FIG. 8, on the dash board rotates its pulley 47 which rotates the first pulley 41 for aligning the mirror 36 as desired for viewing by the driver of the blind area on the vehicle side opposite the driver.

FIG. 9 illustrates another modification of the remote control pivotal mirror assembly. The dash board 25c has bolted thereto a support bracket assumbly 43b bolted to the dash board over a slot 51 in the dash board for extension of a control lever 52 fixedly connected to a splined shaft 21b with a circular clip 52 for turning the left pulley wheel 53. The other or right end of the cables 42c and 42d are fixedly connected to opposite sides of a second pulley similar to 41 of FIG. 8. Locking nuts 54a, 54b, 54d, and 54d make the support bracket 43b variable position relative to the cable housing for varying the tension in the control cables 42c and 42d, only nuts 54a and 54d being illustrated on FIG. 9.

Accordingly, control lever 52 turns the pulley 53 in one direction for turning the first pulley, as 41 of FIG. 8, as well as the mirror in the desired direction to the precise amount of axial rotation for viewing by the driver the blind area on the side of the vehicle opposite to the driver.

Accordingly, four modifications of a remote control pivotal mirror assembly, each moveable through at least 35° have been disclosed for viewing by the driver of the blind area on the vehicle side opposite the driver as prior to making a turn in the direction of the vehicle opposite side.

Obviously other methods may be utilized for viewing by the driver of the side of the vehicle opposite to the driver of the blind area and for forming a remote control pivotal mirror like the embodiments of either FIG. 3, 5, 8, or 9 than those listed above, depending on the particular information desired.

METHOD FOR FORMING OR ASSEMBLING A MIRROR COMBINATION

A second invention disclosed herein comprises a method for forming or assembling a pivotal mirror combination or assembly for the side of a vehicle as illustrated in FIGS. 1C and 2 opposite to the driver's side for viewing by the driver of the blind area D, FIG. 1B, comprising the following steps:

(1) mounting a plane mirror on a pivotal mounting on the vehicle opposite side, and (2) forming the pivotal mounting for providing at least 35° pivotal movement of the mirror from a first line of focus extending outwardly from the vehicle side opposite the driver and normal to the vehicle longitudinal axis to a second line of focus extending 70° rearwardly from the first line of focus.

The first step above may comprise further, (1) mounting a manually operable cable means between a manually operable control in the vehicle cab near the driver and the pivotally mounted mirror in a mirror frame for viewing by the driver of the total blind area on the side opposite the driver.

The second step above may comprise further, (1) connecting a manually operable cable means from a first pulley wheel on the vehicle cab near the driver to the pivotally mounted mirror on a second pulley wheel in a first position with the mirror aligned with the first line of focus normal to the vehicle longitudinal axis, and (2) connecting one end of the manually operable cable means to the first pulley wheel and the other end of the cable means to the second pulley wheel on the movable mounted mirror for movement to a second position with the mirror aligned with the second line of focus for viewing by the driver of the total blind area on the side opposite the driver.

Still further method steps may comprise, (1) connecting one end of a compression spring to the movably mounted mirror, and (2) connecting the other end of the compression spring to a mirror frame at least 70° from the pivotal mirror for preventing vibration in the mirror as it pivots through at least 35° range of motion.

Accordingly, it will be seen that a few methods for viewing the blind side of a vehicle, a few methods for forming a remote control pivotal mirror, and four embodiments of a remote control pivotal mirror have been described and disclosed which will operate in a manner which meets each of the objects set forth hereinbefore.

While only a few methods of viewing of the invention, four mechanisms have been disclosed, and a few methods of forming a rear view mirror have been disclosed, it will be evident that various other methods and modifications are possible in the arrangement and construction of the disclosed methods and remote control pivotal mirror assemblies without departing from the scope of the invention and it is accordingly desired to comprehend within the purview of this invention such methods and modifications as may be considered to fall within the scope of the appended claims.

I claim:

1. A method for viewing by the driver of the blind area opposite a first vehicle side opposite to the driver, as for detecting a second vehicle approaching from a position behind the normal to the first vehicle longitudinal axis through a side mirror pivotally mounted on the first vehicle side, comprising the steps of, (a) Connecting a manually operable cable means from a first pulley wheel on the first vehicle near the driver to the pivotally mounted mirror on a second pulley wheel in a first position with the mirror aligned with the first line of focus normal to the vehicle longitudinal axis and substantially through the side mirror and the driver, (b) Connecting one end of the manually operable cable means to the first pulley wheel on the other end of the cable means to the second pulley wheel on the movably mounted mirror for movement through a sector immediately behind the first line of focus to a second position with the mirror aligned with the second line of focus, (c) Viewing through the pivotally mounted side mirror focused on the first line extending outwardly from the same vehicle side as the normal to the vehicle longitudinal axis through the side mirror, and (d) Viewing through the side mirror as its line of focus is pivoted rearwardly through at least 70° for covering the blind area for detecting the second vehicle approaching from behind said normal to the first vehicle longitudinal axis.

2. A method for viewing by a driver of the blind area opposite a first vehicle side opposite a first vehicle side opposite to the driver for detecting a second vehicle behind the normal to the first vehicle longitudinal axis substantially through a vehicle pivotally mounted side mirror, comprising the steps of, (a) Connecting a manually operable cable means from a first pulley wheel on the first vehicle near the driver to the pivotally mounted mirror on a second pulley wheel in a first position with the mirror aligned with the first line of focus normal to the vehicle longitudinal axis and substantially through the side mirror and the driver, (b) Connecting one end of the manually operable cable means to the first pulley wheel on the other end of the cable means to the second pulley wheel on the movably mounted mirror for movement through a sector immediately behind the first line of focus to a second position with the mirror aligned with the second line of focus, (c) Viewing through the vehicle pivotally mounted side mirror focused on said normal to the vehicle longitudinal axis, and (d) Viewing through the side mirror through at least 70° rearwardly of said normal.

3. A method for viewing by the driver of the blind area opposite a first vehicle side opposite to the driver, as for detecting a second vehicle behind the normal to the first vehicle longitudinal axis and substantially through a side mirror pivotally mounted on the first vehicle opposite side, comprising the steps of, (a) Connecting a manually operable cable means from a first pulley wheel on the first vehicle near the driver to the pivotally mounted mirror on a second pulley wheel in a first position with the mirror sligned with the first line of focus normal to the vehicle longitudinal axis and substantially through the side mirror and the driver, (b) Connecting one end of the manually operable cable means to the first pulley wheel on the other end of the cable means to the second pulley wheel on the movably mounted mirror for movement through a sector immediately behind the first line of focus to a second position with the mirror aligned with the second line of focus, (c) Focusing the vehicle pivotally mounted side mirror on a first line extending outwardly from the vehicle side substantially opposite the driver normal to the vehicle longitudinal axis for viewing thereof by the driver along the first line, and (d) Pivoting the side mirror rearwardly through at least 35° for viewing by the driver as the mirror is pivoted for covering the total blind area for detecting the second vehicle behind the normal to the first vehicle longitudinal axis and substantially through the driver.

4. A method for viewing by the driver of the blind area opposite a first vehicle side opposite to the driver, as for detecting a second vehicle behind the normal to the first vehicle longitudinal axis and substantially through the driver, comprising the steps of, (a) Connecting a manually operable cable means from a first pulley wheel on the first vehicle near the driver to the pivotally mounted mirror on a second pulley wheel in a first position with the mirror aligned with the first line of focus normal to the vehicle longitudinal axis and substantially through the side mirror and the driver, (b) Connecting one end of the manually operable cable means to the first pulley wheel on the other end of the cable means to the second pulley wheel on the movably mounted mirror for movement through a sector immediately behind the first line of focus to a second position with the mirror aligned with the second line of focus, (c) Focusing the vehicle pulley wheel pivotally mounted side mirror on the first line extending outwardly from the vehicle substantially opposite the driver normal to the vehicle longitudinal axis for viewing and controlling with a second pulley wheel thereof by the driver along the first line, and (d) pivoting the side mirror through at least 35° rearwardly for focussing on a second line extending at least at an angle of 70° rearwardly from the first line for viewing therein by the driver along the second line to cover the extremities of the blind area for detecting the second vehicle behind the normal to the first vehicle longitudinal axis and substantially through the driver.

5. A method for viewing by the driver of the blind area opposite a first vehicle side opposite to the driver, as for detecting a second vehicle behind the normal to the first vehicle longitudinal axis and substantially through the driver, comprising the steps of, (a) Connecting a manually operable cable means from a first pulley wheel on the first vehicle near the driver to the pivotally mounted mirror on a second pulley wheel in a first position with the mirror aligned with the first line of focus normal to the vehicle longitudinal axis and substantially through the side mirror and the driver, (b) Connecting one end of the manually operable cable means to the first pulley wheel on the other end of the cable means to the second pulley wheel on the movably mounted mirror for movement through a sector immediately behind the first line of focus to a second position with the mirror aligned with the second line of focus, (c) focusing the vehicle pivotally mounted mirror on a first line extending outwardly from the vehicle side opposite the driver and approximately 20° back of the normal to the vehicle longitudinal axis at the point of the side mirror mounting for viewing thereof by the driver along the first line, and (d) Pivoting the side mirror rearwardly through at least 25° to the second line for viewing by the driver as the side mirror is pivoted for covering the total blind area from the first line to the second line defining the limits of the blind area for detecting the second vehicle behind the normal to the first vehicle longitudinal axis and substantially through the driver.

6. A method for assembling a mirror assembly for the side of a first vehicle opposite to the driver's side for detecting a second vehicle in the sector behind the normal to the longitudinal axis of the first vehicle substantially through the driver and the side mirror comprising, (a) Pivotally mounting a plane mirror on the first vehicle opposite side, (b) Forming the pivotal mounting for providing at least 35° pivotal movement of the mirror from a first line of focus extending outwardly from the first vehicle longitudinal axis and substantially through the side mirror to a second line of focus extending at least 70° rearwardly from the first line of focus forming a sector, (c) Attaching a manually operable cable means from a first pulley wheel on the first vehicle near the driver to a second pulley wheel on the pivotally mounted mirror in a first position with the mirror aligned with the first line of focus, and (d) Securing one end of the manually operable cable means to the first pulley wheel on the other end of the cable means to the second pulley wheel on the movably mounted mirror for movement through the sector to a second position with the mirror aligned with the second line of focus for viewing by the driver for detecting the second vehicle in said sector.

7. A method as recited in claim 6 wherein the first step comprises further, (a) mounting a manually operable cable means between a manually operable control in the first vehicle near the driver and the pivotally mounted mirror in a mirror frame for viewing by the driver of the total blind area on the side opposite the driver in the sector immediately behind the first line of focus extending outwardly from the first vehicle side opposite the driver and normal to the first vehicle longitudinal axis.

8. A method for forming a mirror assembly for the side of a first vehicle opposite to the driver's side for detecting a second vehicle in the sector behind the normal to the longitudinal axis of the first vehicle substantially through the driver and the side mirror comprising, (a) Mounting a plane mirror on a pivotal mounting on the first vehicle opposite side, (b) Connecting a manually operable cable means from a first pulley wheel on the first vehicle near the driver to the pivotally mounted mirror on a second pulley wheel in a first position with the mirror aligned with the first line of focus normal to the vehicle longitudinal axis and substantially through the side mirror and the driver, (c) Connecting one end of the manually operable cable means to the first pulley wheel on the other end of the cable means to the second pulley wheel on the movably mounted mirror for movement through a sector immediately behind the first line of focus to a second position with the mirror aligned with the second line of focus, and (d) Forming the pivotal mounting for providing at least 35° pivotal movement of the mirror from the first line of focus extending outwardly from the first vehicle longitudinal axis and substantially through the side mirror to a second line of focus extending at least 70° rearwardly from the first line of focus forming a sector for viewing by the driver for detecting the second vehicle in said sector.

* * * * *